United States Patent
Shoji

(10) Patent No.: US 6,480,482 B1
(45) Date of Patent: Nov. 12, 2002

(54) MULTI-USER INTERFERENCE CANCELLOR WITH SMALL SIZED CIRCUITS AND LITTLE QUANTITY OF CALCULATION

(75) Inventor: Takashi Shoji, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/386,204

(22) Filed: Aug. 30, 1999

(30) Foreign Application Priority Data

Aug. 28, 1998 (JP) .......................................... 10-243617

(51) Int. Cl.[7] .............................................. H04B 7/216
(52) U.S. Cl. ...................... 370/342; 370/335; 370/201; 375/144; 375/148; 375/147; 375/346
(58) Field of Search ................................ 370/342, 335; 375/144, 147, 148, 346, 347, 348, 140

(56) References Cited

U.S. PATENT DOCUMENTS

| | | | | |
|---|---|---|---|---|
| 5,629,929 A | * | 5/1997 | Blanchard et al. | 370/201 |
| 5,724,378 A | * | 3/1998 | Miki et al. | 375/200 |
| 6,049,607 A | * | 4/2000 | Marash et al. | 379/410 |
| 6,081,516 A | * | 6/2000 | Yoshida et al. | 370/342 |
| 6,137,788 A | * | 10/2000 | Sawahashi et al. | 370/342 |

FOREIGN PATENT DOCUMENTS

| | | |
|---|---|---|
| EP | 0 823 796 A2 | 2/1998 |
| EP | 0 849 888 A2 | 6/1998 |
| JP | 2-737775 | 1/1998 |
| JP | 2-737776 | 1/1998 |
| JP | 10-51353 | 2/1998 |
| JP | 2-746261 | 2/1998 |
| JP | 10-117180 | 5/1998 |
| WO | WO 96/03819 | 2/1996 |

OTHER PUBLICATIONS

S. Moshavi et al., "Multi–User Detection for DS–CDMA Communications", vol. 34, No. 10, Oct. 1, 1996, pp. 124–136.

* cited by examiner

Primary Examiner—Edward F. Urban
Assistant Examiner—Marceau Milord
(74) Attorney, Agent, or Firm—Sughrue Mion, PLLC

(57) ABSTRACT

In the particular one of interference canceling stages of the multi-user interference cancellor of the parallel processing type, the IEUs reproduce the symbol replica signals from the input signal of the stage, and also produce the local spread signals. The local spread signals have result information of the reproduction in only the IEUs, respectively, and have not been subjected to filtering, yet. Such local spread signals are multiplexed into the multiplexed signal, and then, is subjected to amplitude limitation, to be the amplitude limited signal. After then, the amplitude limited signal is filtered by the filter, to be input into the subtracter. The subtracter subtracts the filtered signal from the input signal of this stage, and thereby, to produce the output of this stage.

12 Claims, 9 Drawing Sheets

MULTI-USER INTERFERENCE CANCELLOR WITH SMALL SIZED CIRCUITS AND LITTLE QUANTITY OF CALCULATION

BACKGROUND OF THE INVENTION

This invention relates to CDMA (Code Division Multiple Access) communication system and, in particular to multi-user interference cancellor which is installed in a receiving apparatus of the system and is adapted to cancel mutual interference among user-signals.

In the CDMA communication system, a transmitter spreads spectrums of a user signal with particular codes which have transmission rates that are much higher than the user signal, to produce a spread user-signal. Such a spread user-signal is transmitted through transmission paths on which base stations, exchanges, or the like, are existing.

Generally, multiple users participate in the CDMA communication system so that spread user-signals of multiple users are multiplexed on the transmission path. Herein, such a multiplexed signal is referred to as a multi-user spread-signal. In the multi-user spread-signal, interference occurs due to mutual correlation in accordance with user-signals. The interference decreases the quality of the communication and therefore, it is undesirable.

To remove the influence of the interference, the receiving apparatus of the system has an interference cancellor. In a popular way, the interference cancellor produces symbol replica signals corresponding to the user signals, by using propagation characteristics of the transmission paths, the codes responding to the user signals, and so on. Then, to extract a particular user signal, the interference cancellor repeatedly subtracts, from the multi-user spread-signals, spread replica signals obtained by spreading the symbol replica signals except for one symbol replica signal corresponding to the particular user. For the repeated processing, the interference cancellor generally has a plurality of interference canceling stages each of which executes one subtraction process as mentioned above. For example, such a technique is disclosed in Japanese Patent Laid-Open (JP-A) No. 10-117180.

Also, the above interference cancellor has been applied to extract all user-signals at the same time. Such an application of the interference cancellor is called a multi-user interference cancellor and, for example, is disclosed in Japanese Patent Nos. 2737775, 2737776, and 2746261, and JP-A No. 10-51353. Generally, these multi-user interference cancellors have high calculation loads and are large sized circuits, due to the extraction of all user-signals. Therefore, research has been directed to decreasing the calculation quantity and shrinking the circuit's size while maintaining accuracy.

However, any proposals have not yet provided a sufficient scheme. One proposal provides small sized circuits but has a low accuracy. Another proposal has a high accuracy but provides large sized circuits and much quantity of the calculation.

SUMMARY OF THE INVENTION

This invention, therefore, provides a multi-user interference cancellor having a high accuracy, shrinked circuits and a little quantity of the calculation.

According to one aspect of the present invention, in response to a multi-user spread signal having a plurality of spread user-signals, a multi-user interference cancellor produces user-signals in correspondence with the spread user-signals. Such cancellor comprises a plurality of interference canceling stages. Each of the interference canceling stages reproduces symbol replica signals corresponding to the user-signals in response to an input signal of the interference canceling stage, in question. And also, the interference canceling stage produces a remnant component of the multi-user spread signal as an output signal of the interference canceling stage, in question. For example, such interference canceling stages may be formed by first, middle, and last interference canceling stages which are successively coupled in order.

Herein, each of the interference canceling stages except for the last one comprises a plurality of interference estimation units (IEUs), a processor, and a subtracter.

The IEUs are equal in number to processable user-signals. The IEUs produces the symbol replica signals corresponding to the user-signals assigned to the IEUs, and also, produces local spread signals having result information of processing in only the IEUS, in question, respectively. Herein, the local spread signals are, for example, first spread signals in first interference canceling stage, and middle spread signals in middle interference canceling stage.

The processor processes the local spread signals to calculate, from them, a single vector signal which is obtained by a combination of the local signals. For example, the processor may comprise a multiplexer, an amplitude limiter, and a filter. The multiplexer multiplexes the local spread signals at every IEUs to produce a multiplexed signal. The amplitude limiter limits an amplitude of the multiplexed signal to a processable range of the cancellor, in question, to produce an amplitude limited signal. The filter filters the amplitude limited signal into a filtered signal as the single vector signal.

The subtracter subtracts the single vector signal from the input signal, and thereby, to produce the output signal representative of the remnant component.

Furthermore, the last interference canceling stage produces the user-signals from the symbol replica signals and the output signal all produced by a preceding one of the interference canceling stages.

DESCRIPTION OF THE PREFERRED EMBODIMENTS

Prior to the description of the preferred embodiments of this invention, a brief description of an existing multi-user interference cancellor will first be made to provide a better understanding of this invention.

Figure 1:
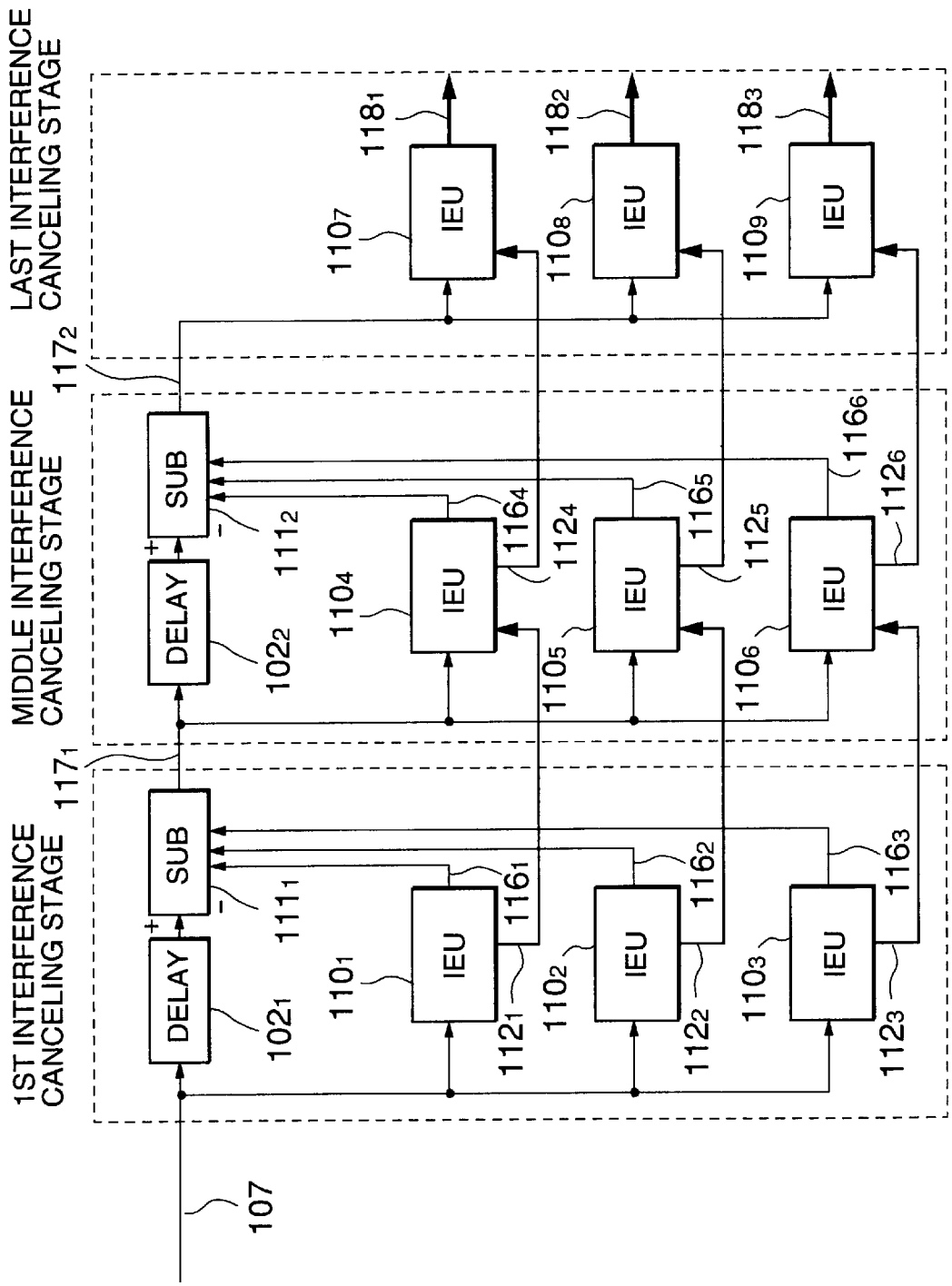
FIG. 1 shows a block diagram of an existing multi-user interference cancellor.

Referring to FIG. 1, an existing multi-user interference cancellor is shown having parallel processing for three user-signals and having three interference canceling stages.

In FIG. 1, the existing multi-user interference cancellor receives a multi-user spread signal in which a plurality of spread user-signals are multiplexed or vector-synthesized.

The existing multi-user interference cancellor comprises three stages of first, middle and last interference canceling stages. Each of the interference canceling stages has three interference estimation units hereinafter abbreviated to IEUs) $110_1$–$110_3$, $110_4$–$110_6$ or $110_7$–$110_9$. That is, the number of the IEUs arranged at each stage is equal to that of the processable user-signals, namely three. These IEUs are of the so-called symbol replica processing type. The first and the middle interference canceling stages further comprise subtracters SUBs) $111_1$ and $111_2$, and delay units $102_1$ and $102_2$, respectively, while the last interference canceling stage comprises only the three IEUs $110_7$–$110_9$. Hereinafter, the IEUs of the first, middle and last stages are also referred to as first IEUs, middle IEUs and last IEUs, respectively. For example, the first IEUs are the IEUs $110_1$–$110_3$.

Roughly speaking, responsive to the multi-user spread-signal 107, the first IEUs $110_1$–$110_3$ of the first interference canceling stage produce first symbol replica signals $112_1$–$112_3$ corresponding to user-signals, and then, outputs them into the middle IEUs $110_4$–$110_6$, respectively. Also, the first IEUs $110_1$–$110_3$ produce first spread signals $116_1$–$116_3$ obtained by spreading the first symbol replica signals $112_1$–$112_3$. On the other hand, the delay unit $102_1$ delays the multi-user spread-signal 107 to produce a delayed signal. The subtracter $111_1$ subtracts the first spread signals from the delayed signal to produce first stage-signal $117_1$. Thus, the first interference stage reproduces the first symbol replica signals $112_1$–$112_3$ from the multi-user spread-signal 107 and also produces the remnant component of the multi-user spread-signal 107 as the first stage-signal $117_1$.

When the first stage-signal $117_1$ is transmitted into the middle interference canceling stage, the middle IEUs $110_4$–$110_6$ despread the first stage-signal $117_1$, and then, add the despread signals to the first symbol replica signals $112_1$–$112_3$ to produce middle symbol replica signals $112_4$–$112_6$. The middle symbol replica signals $112_4$–$112_6$ transmit into the last IEUs $110_7$–$110_9$. Also, the middle IEUs $110_4$–$110_6$ subtract the first symbol replica signals $112_1$–$112_3$ from the middle symbol replica signals $112_4$–$112_6$, and then, spread the subtracted signals, again. And thereby, the middle IEUs $110_4$–$110_6$ produce the middle spread signal $116_4$–$116_6$ which have information of the difference between the first and the middle symbol replica signals $112_1$–$112_3$ and $112_4$–$112_6$, respectively. The subtracter $111_2$ subtracts the middle spread signals $116_4$–$116_6$ from the first stage-signal $117_1$ delayed at the delay unit $102_2$ to produce middle stage-signal $117_2$. The middle stage signal $117_2$ indicates the remnant component of the multi-user spread-signal 107 left over from extracting the middle symbol replica signals $112_4$–$112_6$ by the first and the middle interference canceling stages.

In response to the middle stage-signal $117_2$, each of the last IEUs $110_7$–$110_9$ at the last interference canceling stage despreads the signal $117_2$, and then, adds the despread signal to the middle symbol replica signal $112_4$–$112_6$ to produce the user-signal $118_1$–$118_3$.

Next, explanation will be made about the IEU's structure in detail, to clarify the problems that the existing multi-user interference cancellor has. Herein, the IEUs 1101–1109 have similar structures but are used in a different way at each stage. Among them, only the middle IEUs 1104–1106 use full functions thereof, but the first and the last IEUs 1101–1103 1107–1109 do not. Therefore, the description will be at first made about the structure of the IEU 1104 as the example of the middle IEUs 1104–1106 with FIG. 2, and then, the first and the last IEUs will be described.

Figure 2:
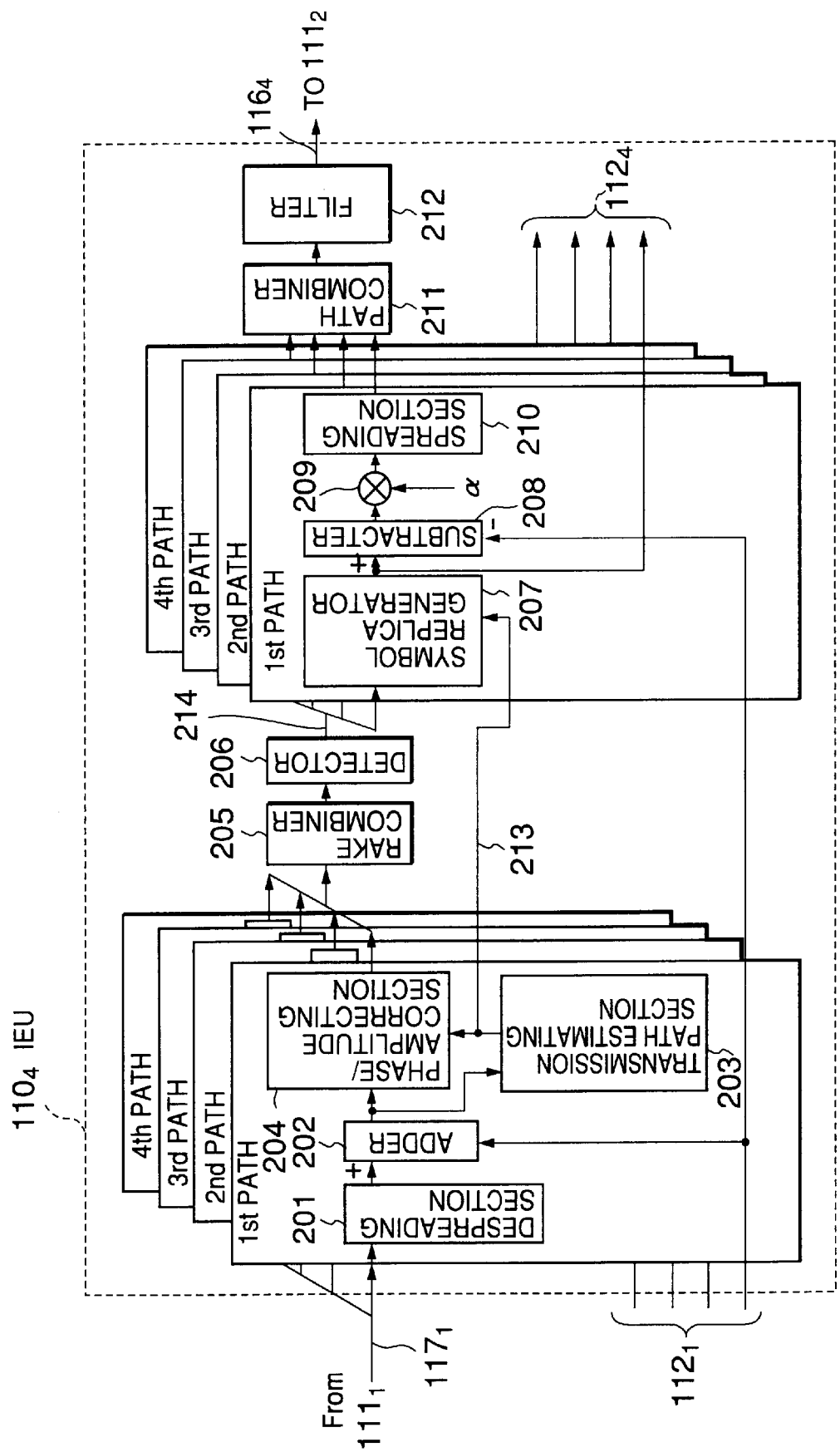
FIG. 2 shows a block diagram of an interference estimation unit illustrated in FIG. 1.

Referring to FIG. 2, the middle IEU $110_4$ comprises despreading sections 201, adders 202, transmission path estimating sections. 203, phase/amplitude correcting sections 204, a RAKE combiner 205, a detector 206, symbol replica generators 207, subtracters 208, multipliers 209, spreading sections 210, a path combiner 211, and a filter 212. Among them, the despreading sections 201, the adders 202, the transmission path estimating sections 203, the phase/amplitude correcting sections 204, the symbol replica generators 207, the subtracters 208, the multipliers 209, spreading sections 210 correspond to paths, respectively. That is, the IEU $110_4$ is for multipath demodulation.

In the illustrated IEU $110_4$, the despreading section 201 receives the first stage-signal $117_1$ transmitted from the subtracter 1111 of the first interference canceling stage, and then, executes despreading with unique codes assigned to the responding user. The despread signal transmits into the adder 202. The adder 202 also receives the first symbol replica signal $112_1$ from the first IEU $110_1$, and adds the first symbol replica signal $112_1$ to the despread signal. The added signal inputs into the transmission path estimating section 203 and the phase/amplitude correcting section 204. The transmission path estimating section 203 previously knows propagation characteristics of the transmission path. Therefore, respective to the added signal, the transmission path estimating section 203 can produce distortion information signal 213 of the transmission path, which inputs to the phase/amplitude correcting section 204 and the symbol replica generator 207. The phase/amplitude correcting section 204 removes, from the added signal, distortion according to the transmission path, using the distortion information signal 213, and then, produces a corrected signal.

The RAKE combiner 205 combines the corrected signals produced at every path to gas a produce a combined signal. The combined signal is detected at the detector 206, and thereby, noise is removed to be produced as a detected signal 214. The detected signal 214 is subjected to multipath processing, as the following.

The symbol replica generator 207 adds, to the detected signal 214, the distortion information signal 213 transmitted from the transmission path estimating section 203 to produce the middle symbol replica signal $112_4$. Such middle symbol replica signal $112_4$ does not have the noise due to the operation of the detector 206, but does specific distortion according to transmission path. This signal $112_4$ is transmitted into the subtracter 208 and the respective last IEU $110_7$. The subtracter 208 also receives the first symbol replica signal $112_1$ and subtracts the first symbol replica signal $112_1$ from the middle symbol replica signal $112_4$ to produce a subtracted signal. Thus, the subtracted signal is a signal relating to the difference between symbol replica signal of current stage and that of pre-stage. The subtracted signal is multiplied by an interference removal suppression coefficient α at the multiplier 209 to be introduced into the spreading section 210. Herein, the interference removal suppression coefficient α is a coefficient for controlling the convergence rate of the interference cancellor. The spreading section 210 spreads spectrum of the signal produced by the multiplier 209 with the unique codes assigned to the respective user, again.

Spread signals from the spreading sections 210 of all paths are combined at the path combiner 211 to produce a spread combination signal. The spread combination signal indicates the difference between the current stage symbol replica signal and the pre-stage symbol replica signal because the spread combination signal comprises the subtracted signals produced by the subtracters 208 of every paths, as mentioned above. Such spread combination signal is filtered at the filter 212 to be produced a middle spread-signal $116_4$ as an output of the middle IEU $110_4$. Herein, the filter 212 is a waveform-shaping filter and has the same filtering characteristic as the transmission/reception filter for the multi-user spread-signal. That is, the characteristic of the filter 212 depends on the processable range of the receiving apparatus. Furthermore, the middle IEUs $110_5$ and $110_6$ do the same processing as the IEU $110_4$, too.

Based on such processing of the middle IEU $110_4$, explanations of the first IEUs $110_1$–$110_3$ and the last IEUs $110_7$–$110_9$ are made as the followings.

The first interference canceling stage has no pre-stage, so that the first IEUs $110_1$–$110_3$ are input no symbol replica signal of pre-stage. Therefore, the adders 202 of the first IEUs $110_1$–$110_3$ add "0" to the despread signals produced by the despreading sections 201. Such first symbol replica signals $112_1$–$112_3$ do not have all parts of the user-signals. Moreover, the subtracters 208 receive only current symbol replica signals $112_1$–$112_3$, and do not receive other symbol replica signals. Thus, first spread-signals $116_1$–$116_3$ produced by the filters 212 of the first IEUs $110_1$–$110_3$ do not indicate the difference between the current stage symbol replica signal and the pre-stage symbol replica signal, but are signals which have first symbol replica signals $112_1$–$112_3$ of every paths.

On the other hand, the last interference canceling stage outputs, as the user signals $118_1$–$118_3$, the signals 214 detected by the detectors 206 of the last IEUs $110_7$–$110_9$. Therefore, the last IEUs $110_7$–$110_9$ may not have the symbol replica generators 207, the subtracters 209, the multipliers 209, the spreading sections 210, the path combiners 211, and the filters 212.

As mentioned above, the existing multi-user interference canceller executes the filtering process in each of the IEUs, and then, does the subtracting process at the subtracter. Thus, each IEU requires the filter 212 in the existing multi-user interference canceller.

It is to be noted here that the filter 212 must calculate at the several times processing rate as high as the chip-rate, to execute waveform-shaping of the signal combined by the path combiner 211. For example, the sampling rate must be higher than twice signal processing rate in the digital signal processing. Beside that, the object of the calculation is the signal that has been already spread, so that the quantity of the calculation is too much at each filter 212. In spite of that, the filters 212 are installed in every IEUs $110_1$–$110_9$. That is, the number of the filters 212 is that of IEUs $110_1$–$110_9$, for example, nine in the illustrated canceller. Thus, the existing multi-user interference canceller has inefficient calculation for size of its circuit.

This invention solves the problem of the existing canceller. Now, explanation of a preferred embodiment of this invention will be made with reference to drawings, applying this invention to a multi-user interference canceller.

Figure 3:
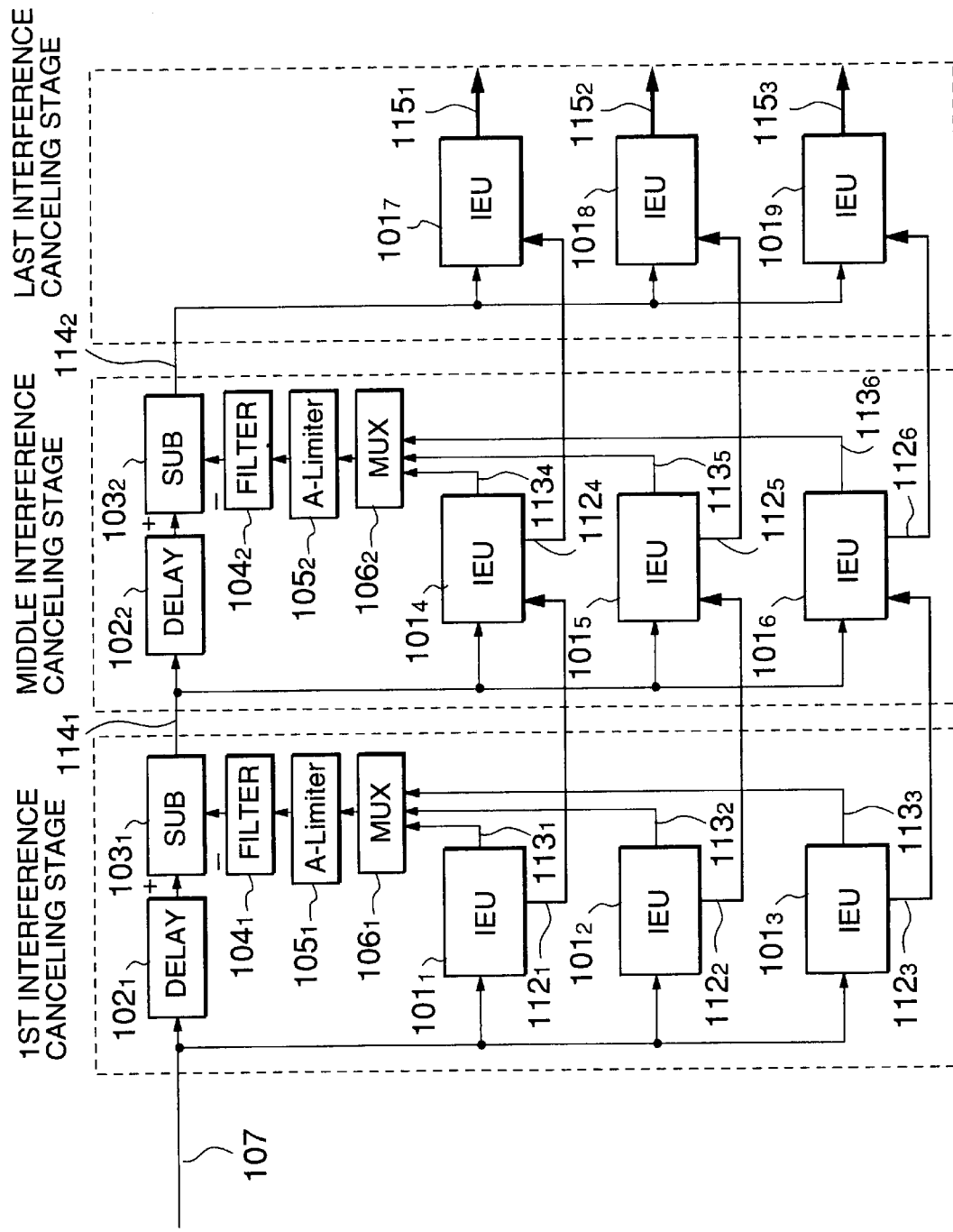
FIG. 3 shows a block diagram of a multi-user interference cancellor according to a preferred embodiment of this invention.

Referring to FIG. 3, a multi-user interference canceller according to a preferred embodiment of the present invention is of parallel processing type for three user-signals and has three interference canceling stages.

In FIG. 3, the multi-user interference canceller of the preferred embodiment receives a multi-user spread signal 107 where a plurality of spread user-signals are multiplexed or vector-synthesized.

The multi-user interference canceller comprises three stages of first, middle and last interference canceling stages, each of which has three IEUs $101_1$–$101_3$, $101_4$–$101_6$ or $101_7$–$101_9$. These IEUs are of the so-called symbol replica processing type. Herein, the IEUs of the first, middle and last stages illustrated in FIG. 3 are called first IEUs, middle IEUs and last IEUs, respectively. Furthermore, the first and the middle interference canceling stages comprise delay units $102_1$ and $102_2$, subtracters (SUBs) $103_1$ and $103_2$, filters $104_1$ and $104_2$, amplitude limiters (A-limiters) $105_1$ and $105_2$, and multiplexers (MUX) $106_1$ and $106_2$, respectively. Thus, the canceller of the preferred embodiment illustrated in FIG. 3 has the filters $104_1$ and $104_2$, the amplitude limiters $105_1$ and $105_2$, and the multiplexers $106_1$ and $106_2$, as different components in comparison with the existing cancellor shown in FIG. 1.

Figure 4:
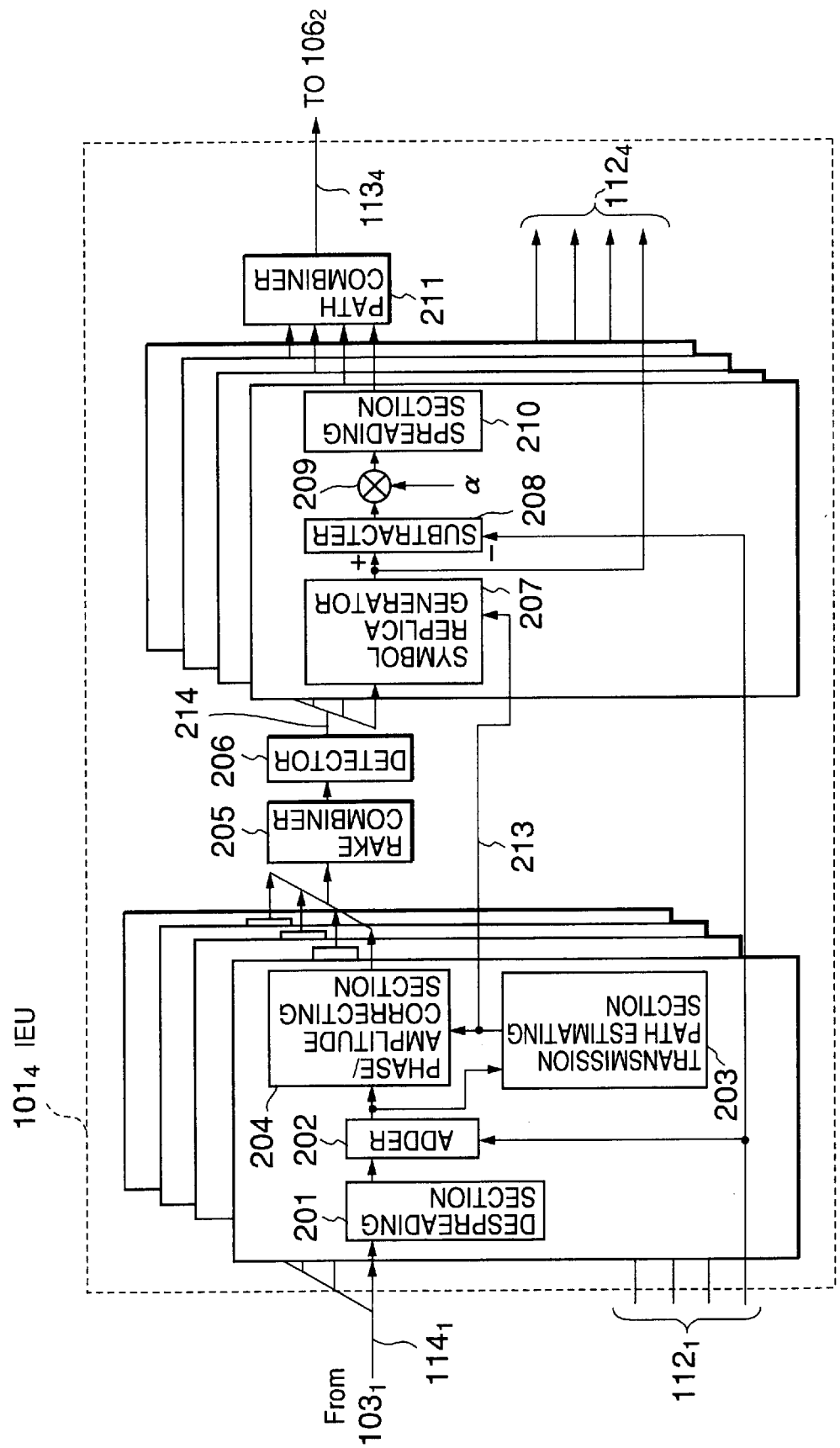
FIG. 4 shows a block diagram of an interference estimation unit illustrated in FIG. 3.

Furthermore, the middle IEU $101_4$ is depicted in FIG. 4. As compared the FIG. 4 with FIG. 2, the IEUs of this embodiment has the same structure as the existing IEUs, except for the filter 212. Thus, the first and middle IEUs $101_1$–$101_3$ and $101_4$–$101_6$ do not produce filtered signals, but produce non-filtered signals, namely the spread combination signals from the path combiners 211, as first and middle spread signal $113_1$–$113_3$ and $113_4$–$113_6$.

That is, the canceller of this embodiment does not execute filtering process at every IEUs $101_1$–$101_9$. This canceller multiplexes outputs of the IEUS, and then, executes amplitude limitation and filtering for them, at each one of the first and middle interference canceling stages.

Next, concrete description will be made about the operation of the multi-user interference canceller according to the preferred embodiment of this invention, with reference to FIG. 5 also. In this description, the multi-user spread-signal 107 has the spread user-signals obtained by spreading spectrums of user-signals of users $U_1$, $U_2$, $U_3$. That is, the IEUs $101_1$, $101_4$, $101_7$ respond to the user $U_1$, and similarly, the IEUs $101_2$, $101_5$, $101_8$ to the user $U_2$, the IEUs $101_3$, $101_6$, $101_9$ to the user $U_3$.

Figure 5:
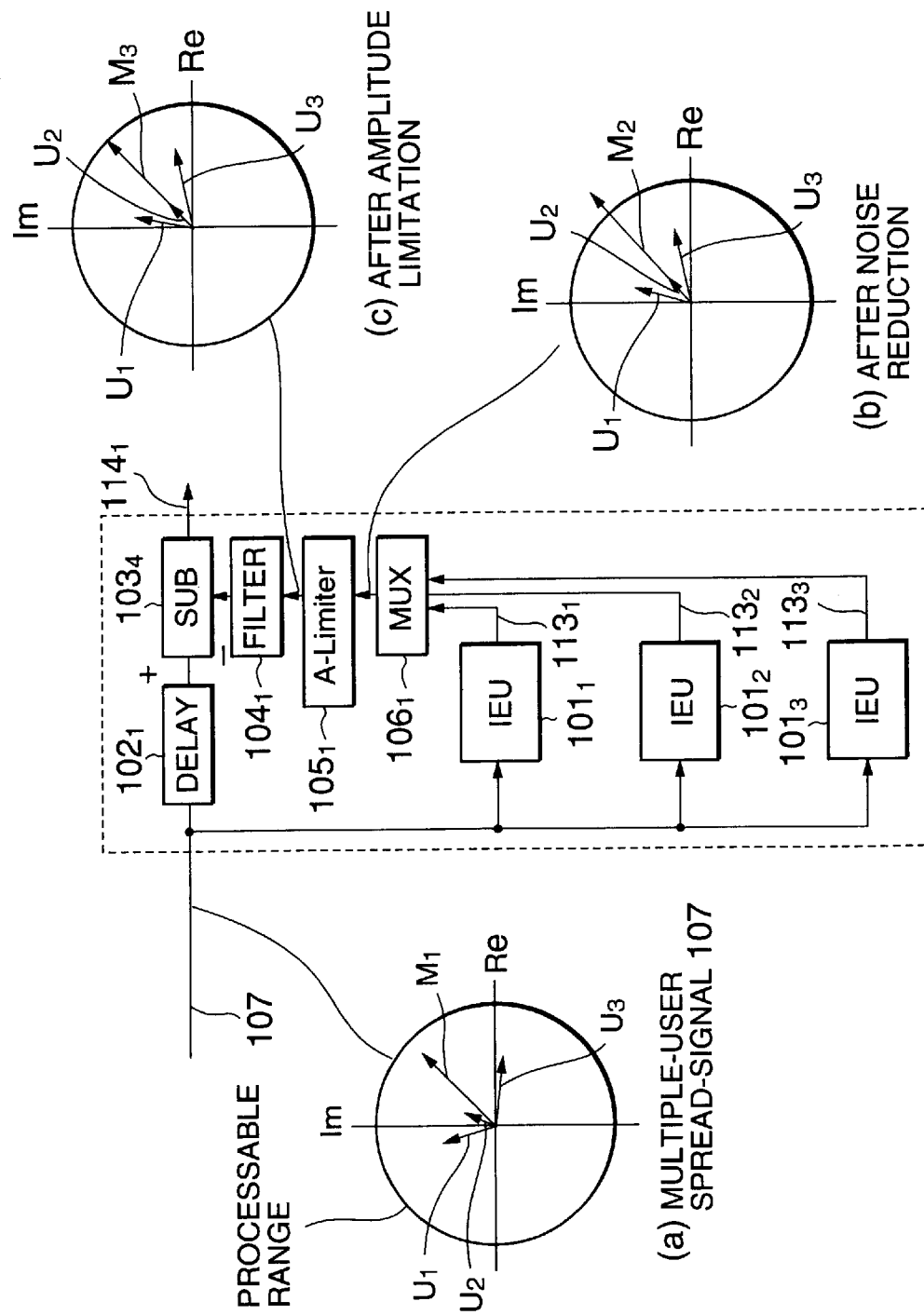
FIG. 5 shows relationships every user's components and multiplied signals thereof.

When the multi-user spread-signal 107 (see $M_1$ shown in state (a) in FIG. 5) is input into the first interference canceling stage, the first IEUs $110_1$–$110_3$ execute noise reduction of the respective components of the signal 107 to produce first symbol replica signals $112_1$–$112_3$ of the users $U_1$–$U_3$, respectively. These first symbol replica signals $112_1$–$112_3$ are transmitted into the middle IEUs $101_4$–$101_6$ Also, the first IEUs $101_1$–$101_3$ produce first spread signals $113_1$–$113_3$ obtained by spreading the first symbol replica signals $112_1$–$112_3$. In this embodiment, the first spread signals have not been subjected to filtering process, but have been subjected to the noise reduction, as mentioned above. These first spread signals $113_1$–$113_3$ are multiplexed by the multiplexer $106_1$ to be a multiplexed signal $M_2$ which is a single vector signal as shown in state (b) in FIG. 5. And then, the multiplexed signal is subjected to amplitude limitation of the amplitude limiter $105_1$ to be an amplitude limited signal $M_3$ shown in state (c) in FIG. 5. Furthermore, the filter $104_1$ filters the amplitude limited signal $M_3$ to input into the subtracter $103_1$. Herein, the filter $104_1$ is a waveform-shaping filter and has the same filtering characteristic as the filter 212 shown in FIG. 2. That is, the characteristic of the filter $104_1$ depends on the processable range of the canceller. The filter $104_2$ of the middle interference canceling stage also does.

The subtracter $103_1$ subtracts the amplitude limited signals from the multi-user spread-signal 107 delayed by the delay unit $102_1$ to produce first stage-signal $114_1$. Thus, the first interference stage reproduces the first symbol replica signals $112_1$–$112_3$ from the multi-user spread-signal 107 and also produces the rest of the multi-user spread-signal 107 as the first stage-signal $114_1$.

When the first stage-signal $114_1$ is transmitted into the middle interference canceling stage, the middle IEUs $101_4$–$101_6$ despread the first stage-signal $114_1$ to produce, as despread signals, signal components of user $U_1$–$U_3$ of the first stage-signal $114_1$, respectively. And then, the middle IEUs $101_4$–$101_6$ add the despread signals to the first symbol replica signals $112_1$–$112_3$ to produce middle symbol replica signals $112_4$–$112_6$. The middle symbol replica signals $112_4$–$112_6$ have parts of the user-signals, which are reproduced by the first and middle stages of the cancellor. The middle symbol replica signals $112_4$–$112_6$ transmit into the last IEUs $101_7$–$101_9$.

Also, the middle IEUs $101_4$–$101_6$ subtract the first symbol replica signals $112_1$–$112_3$ from the middle symbol replica signals $112_4$–$112_6$, and then, spread spectrums of the subtracted signals, again. Such signals have the same signal components as the output signals of the despread sections 201. That is, the middle IEUs $101_4$–$110_6$ produce the middle spread signal $113_4$–$113_6$ which have information of the difference between the first and the middle symbol replica signals $112_1$–$112_3$ and $112_4$–$112_6$. Herein, the middle spread signal $113_4$–$113_6$ are subjected to no filtering process, similarly to the first interference canceling stage.

The multiplexer $106_2$ multiplexes the middle spread signals $113_4$–$113_6$ to produce a multiplexed signal. And then, the multiplexed signal is subjected to amplitude limitation of the amplitude limiter $105_2$ to be an amplitude limited signal. Furthermore, the filter $104_2$ filters the amplitude limited signal to input them into the subtracter $103_1$.

The subtracter $103_2$ subtracts the output signal of the filter $104_2$ from the first stage-signal $114_1$ delayed at the delay unit $102_2$ to produce middle stage-signal $114_2$. The middle stage signal $114_2$ has the information of the remnants of the multi-user spread-signal 107 left over from extracting the middle symbol replica signals $112_4$–$112_6$ by the first and the middle interference canceling stages.

In response to the middle stage-signal $114_2$, each of the last IEUs $101_7$–$101_9$ at the last interference canceling stage despreads the signal $114_2$, and then, adds the despread signal to the middle symbol replica signal $112_4$–$112_6$ to produce the user-signal $115_1$–$115_3$.

With such structure and signal processing, the number of filters in this embodiment decreases in comparison with the existing interference cancellor, because the filters are not installed at every IEUs, but do at every stages except for the last interference canceling stage. Concretely, the cancellor of this embodiment has two filters, that is one third of the existing cancellor. Besides, the tendency goes forward more and more, if the number of the user-signals to be processed increases.

Moreover, the cancellor of this embodiment has two amplitude limiters prior to the filters, as mentioned above. Therefore, even if the multiplexed signal obtained by multiplexing the outputs of the IEUs, belongs to outside of the processable range of the cancellor, the overflow of the multiplexed signal is suppressed before the multiplexed signal reaches to the filter. Consequently, it is not necessary to restrict the level of the multi-user spread signal to low, for the purpose of the suppression of the overflow. As the result, the quality of the multi-user spread-signal is kept at high.

Thus, according to this embodiment, the multi-user interference cancellor can decrease the quantity of the calculation and shrink its circuit size with the ability of interference cancellation kept at high.

Figure 6:
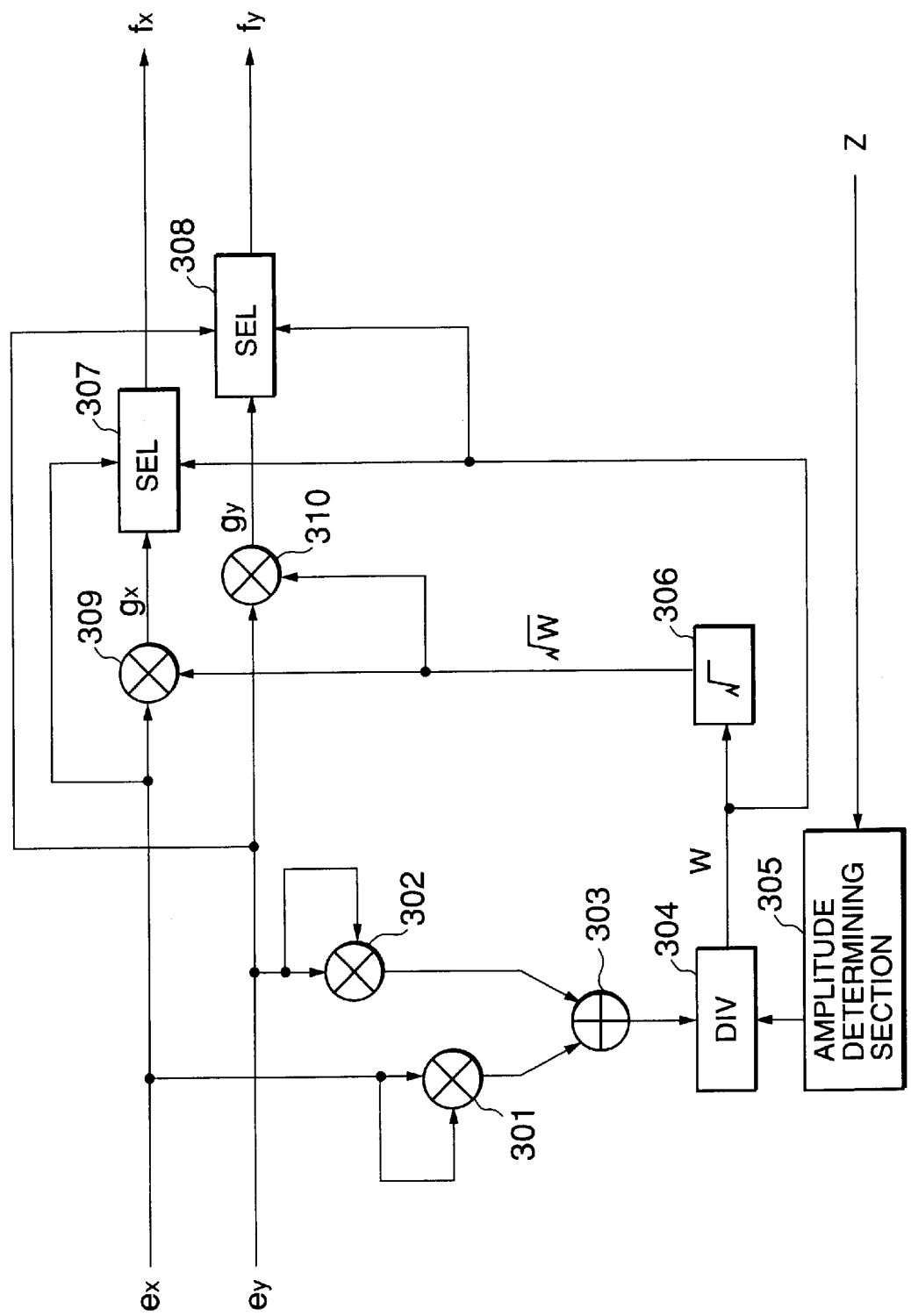
FIG. 6 shows a block diagram of an amplitude limiter illustrated in FIG. 3.

Referring to FIG. 6, structures of the amplitude limiters $105_1$, $105_2$ according to this embodiment are depicted in detail. Herein, the amplitude limiters $105_1$ and $105_2$ are the same structure from each other and operate in the same manner. Therefore, in the following, only the amplitude limiter $105_1$ is explained, and the description about the amplitude limiter $105_2$ is omitted.

The illustrated amplitude limiter has multipliers 301, 302, an adder 303, a divider (DIV) 304, an amplitude determining section 305, a square root calculator ($\sqrt{}$) 306, selectors (SELs) 307, 308, and multipliers 309, 310. Herein, the amplitude determining section 305 is previously given a predetermined amplitude level Z which corresponds to the processable range of the cancellor.

As described before with reference to FIG. 5, output of the multiplexer $106_1$ often exceeds the processable range, because the output is obtained by multiplexing the first spread signals $113_1$–$113_3$ which have the phases close to each other. In this event, the imaginary and the real components $e_x$ and $e_y$ of the multiplexed signal are represented by the following equations.

$$e_x = a_x + b_x + c_x$$
$$e_y = a_y + b_y + c_y$$

where, $a_x$, $b_x$ and $c_x$ are the real components of the first spread signals $113_1$–$113_3$, and $a_y$, $b_y$ and $c_y$ are the imaginary components of the first spread signals $113_1$–$113_3$. That is, the multiplexed signal is a complex signal and a single vector signal.

The multiplier 301 multiplies "$e_x$" by itself to calculate "$e_x^2$", while the multiplier 302 multiplies "$e_y$" by itself to calculate "$e_y^2$." Herein, "$e_x^2$" and "$e_y^2$" are real and imaginary components of the power of the multiplexed signal. The adder 303 adds the real component "$e_x^2$" to the imaginary component "$e_y^2$" to input the power P of the multiplexed signal into the divider 304. On the other hand, the amplitude setting section 305 calculates a square "$Z^2$" of the predetermined level based on the predetermined level Z to transmit "$Z^2$" into the divider 304. The divider 304 divides "$Z^2$" by P to produce a power suppression rate "W," namely, $$W = Z^2 / P$$

The power suppression rate "W" is input into the square root calculator 306, the selectors 307, 308. If the power suppression rate "W" is smaller than "1", then the output of the multiplexer $106_1$ is out of the processable range. On the other hand, if the rate "W" is not, then the output of the multiplexer $106_1$ belongs to the processable range.

The square root calculator 306 calculates the square root of the power suppression rate "W", to produce the square root "$W^{1/2}$." The square root "$W^{1/2}$" is used in the multipliers 309 and 310 to their calculations. The multiplier 309 multiplies the square root "$W^{1/2}$" by the real component "$e_x$" to produce a restricted real component "$g_x$," while the multiplier 310 multiplies the square root "$W^{1/2}$" by the imaginary component "$e_y$" to produce a restricted imaginary component "$g_y$."

$$g_x = e_x W^{1/2}$$
$$g_y = e_y W^{1/2}$$

These components "$g_x$" and "$g_y$" are input into the selectors 307 and 308, respectively.

The selectors 307 and 308 also receive the real and imaginary components "$e_x$" and "$e_y$" of the multiplexed signal. If the power suppression rate "W" is smaller than "1", then the selector 307 selects, as the real component "$f_x$" of output of the amplitude limiter $105_1$, the real component "$g_x$" produced by the multiplier 309, while the selector 307 selects the real component "$e_x$" of the multiplexed signal if the rate "W" is not. On the other hand, if the power suppression rate "W" is smaller than "1", then the selector 308 selects, as the imaginary component "$f_y$" of output of the amplitude limiter $105_1$, the imaginary component "$g_y$" produced by the multiplier 310, while the selector 308 selects the imaginary component "$e_y$" of the multiplexed signal if the rate "W" is not. These components "$f_x$" and "$f_y$" comprise an output of the amplitude limiter $105_1$, as a complex signal ($f_x$, $f_y$) which has a smaller level than the predetermined level "Z", and therefore, always meets the requirement of the processable range of the cancellor.

Now, description will be made about another structure of the amplitude limiters $105_1$, $105_2$ illustrated in FIG. 3. Herein, in the following description, only the amplitude limiter $105_1$ is explained, and the description about the amplitude limiter $105_2$ is omitted, as the same manner of the above amplitude limiters. Furthermore, the description is of the case where maximum value of the processable range is eight bits in the quantized bits expression, and the quantizing process is expressed in twos complement.

In this example, the first stage-signals $113_1$–$113_3$ have the real components $a_x$, $b_x$, $c_x$, and the imaginary components $a_y$, $b_y$, $c_y$, respectively. Each of the components has eight bits including one sign bit. Herein, sign bit is generally for indicating positive or negative numbers consisting of the other bits.

When the components are input into the multiplexer $106_1$, the components are multiplexed by the multiplexer $106_1$ at each component of the real and the imaginary components. And then, the multiplexer $106_1$ produces the multiplexed signal which has real component $e_x$ and imaginary component $e_y$. Here, taking the carrying-up of one bit into consideration, the multiplexer $106_1$ outputs the real and the imaginary components $e_x$ and $e_y$ each of which has nine bits including one sign bit.

Responsive to such multiplexed signal ($e_x$, $e_y$) from the multiplexer $106_1$, the amplitude limiter $105_1$ processes the real and the imaginary components of the multiplexed signal, independently of each other. To this end, the amplitude limiter $105_1$ has two parts which are for the real and the imaginary components. The two parts have the same structure to each other, while are independent from each other. Therefore, only the real part is depicted and is described in detail, but the imaginary part is not referred in detail.

Figure 7:
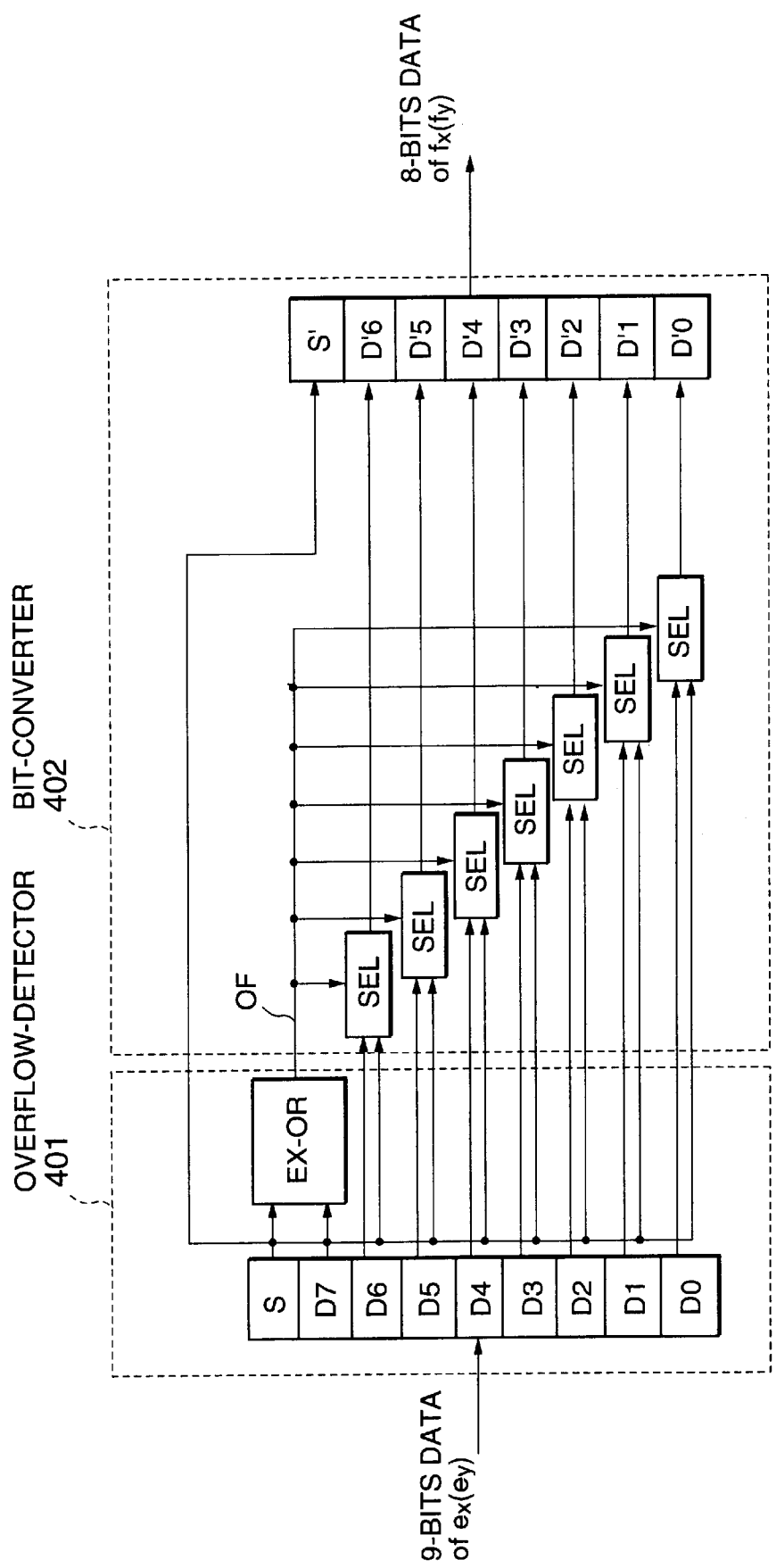
FIG. 7 shows a block diagram of another amplitude limiter illustrated in FIG. 3.

Referring to FIG. 7, the amplitude limiter $105_1$ comprises an overflow-detector 401 and a bit-converter 402, as the real part.

The overflow-detector 401 comprises eight data-bit registers D0–D7, a sign-bit register S and an exclusive-OR unit (EX-OR), and detects whether overflow occurs or not, by executing exclusive-OR operation of the sign bit and the most significant bit (MSB: D7) of the real component ex. And then, the overflow-detector 401 produces an overflow flag (OF). This overflow flag indicates "1" if the overflow occurs, while indicates "0" if the overflow does not.

The bit-converter 402 comprises seven selectors (SELs) corresponding to the seven data-bit registers D0–D6, and other data-bit registers D'0–D'6 and a sign-bit register S'. Each of the selectors selects input data-bit D0–D6 if the overflow flag indicates "0", and produces it. On the other hand, all of the selectors select the seventh data-bit D7, instead of the input data-bits D0–D6, if the overflow flag indicates "1."

As the result, eight bits of the sign-bit register S' and the date-bit registers D'0–D'7 are the real component $f_x$ of the output of the amplitude limiter $105_1$. Similarly, the imaginary component $f_y$ is also calculated in the imaginary part of the amplitude limiter $105_1$. These component $f_x$ and $f_y$ comprise the output of the amplitude limiter $105_1$, which is always in the processable range.

Moreover, concrete operation described in detail, with reference to Table which is relationship between before amplitude limitation and after amplitude limitation. Herein, the processable range is eight bits in the concrete operation.

TABLE

| Decimal Numerical | S and D7-D0 (before amplitude limitation) | S' and D'6-D'0 (after amplitude limitation) |
|---|---|---|
| 255 | 011111111 | 01111111 |
| . | . | . |
| 128 | 010000000 | 01111111 |
| 127 | 001111111 | 01111111 |
| 126 | 001111110 | 01111110 |
| 125 | 001111101 | 01111101 |
| . | . | . |
| 2 | 000000010 | 00000010 |
| 1 | 000000001 | 00000001 |
| 0 | 000000000 | 00000000 |
| −1 | 111111111 | 11111111 |
| −2 | 111111110 | 11111110 |
| . | . | . |
| −125 | 110000011 | 10000011 |
| −126 | 110000010 | 10000010 |
| −127 | 110000001 | 10000001 |
| −128 | 110000000 | 10000000 |
| −129 | 101111111 | 10000000 |
| . | . | . |
| −255 | 100000001 | 10000000 |
| −256 | 100000000 | 10000000 |

Clearly understood from Table, the output consisting of S' and D'0–D'6 becomes "01111111", when the input consisting of S and D0–D7 is larger than "126" in decimal numerical. Also, the output consisting of S' and D'0–D'6 becomes "10000000", when the input consisting of S and D0–D7 is smaller than "−127" in decimal numerical. Thus, the output of the amplitude limiter $105_1$ always belongs to the processable range.

In detail, the sign bit S and the MSB D7 assume "1 0" or "0 1" when the overflow occurs. That is, the exclusive-OR operation of S and D7 results in "1", and thereby, it is found that the overflow occurs. In this event, the bit-converter 402 produces D7 as each of D'0–D'6, and also, produces S as S'. As the result, if the overflow occurs in negative direction (that is, the underflow case), the bit-converter 402 produces "0" of D7 as each of D'0–D'6 and also produces "1" of S as S'. Thus, the output of the amplitude limiter $105_1$ becomes "10000000." On the other hand, if the overflow occurs in positive direction, the bit-converter 402 produces "1" of D7 as each of D'0–D'6 and does "0" of S as S'. Thus, the output of the amplitude limiter $105_1$ becomes "01111111."

While this invention has thus far been described in conjunction with few embodiments thereof, it will now be readily possible for those skilled in the art to put the above embodiments into various other manners. For example, the number of bits of the processable range in quantization may be larger than eight bits, and be smaller than eight bits, too.

Figure 8:
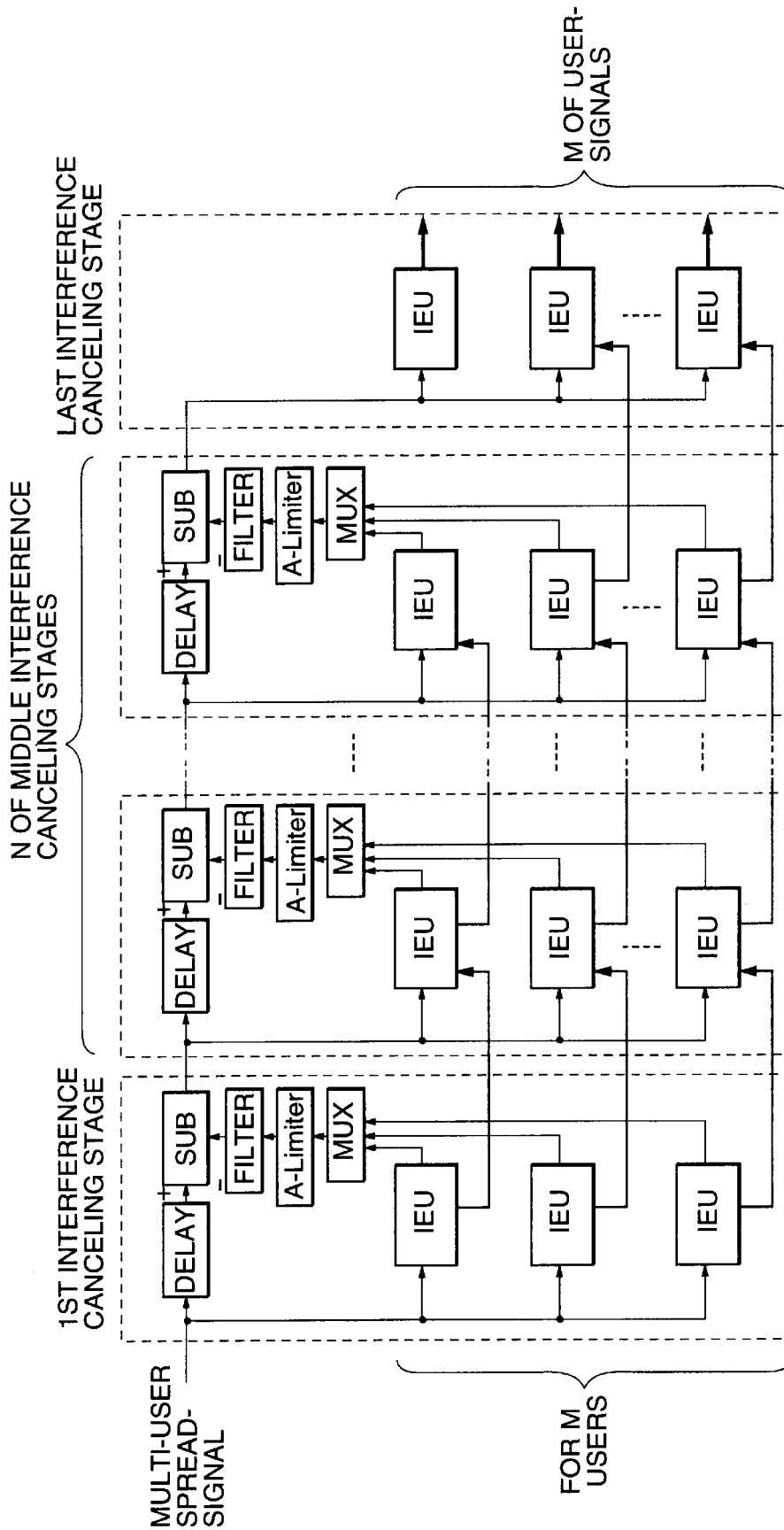
FIG. 8 shows a block diagram of modification of the cancellor shown in FIG. 3, which has a plurality of middle stages.

Moreover, the multi-user interference cancellor may have a plurality of the middle interference canceling stages, instead of one middle interference canceling stage, as shown in FIG. 8. The illustrated multi-user interference cancellor has the first and the last interference canceling stages, and N middle interference canceling stages. Each of the middle interference canceling stages serves similarly to the middle stage in FIG. 3. Also, the cancellor illustrated in FIG. 8 is for user-signals, M in number. That is, each of the stages comprises the IEUs, M in number.

Figure 9:
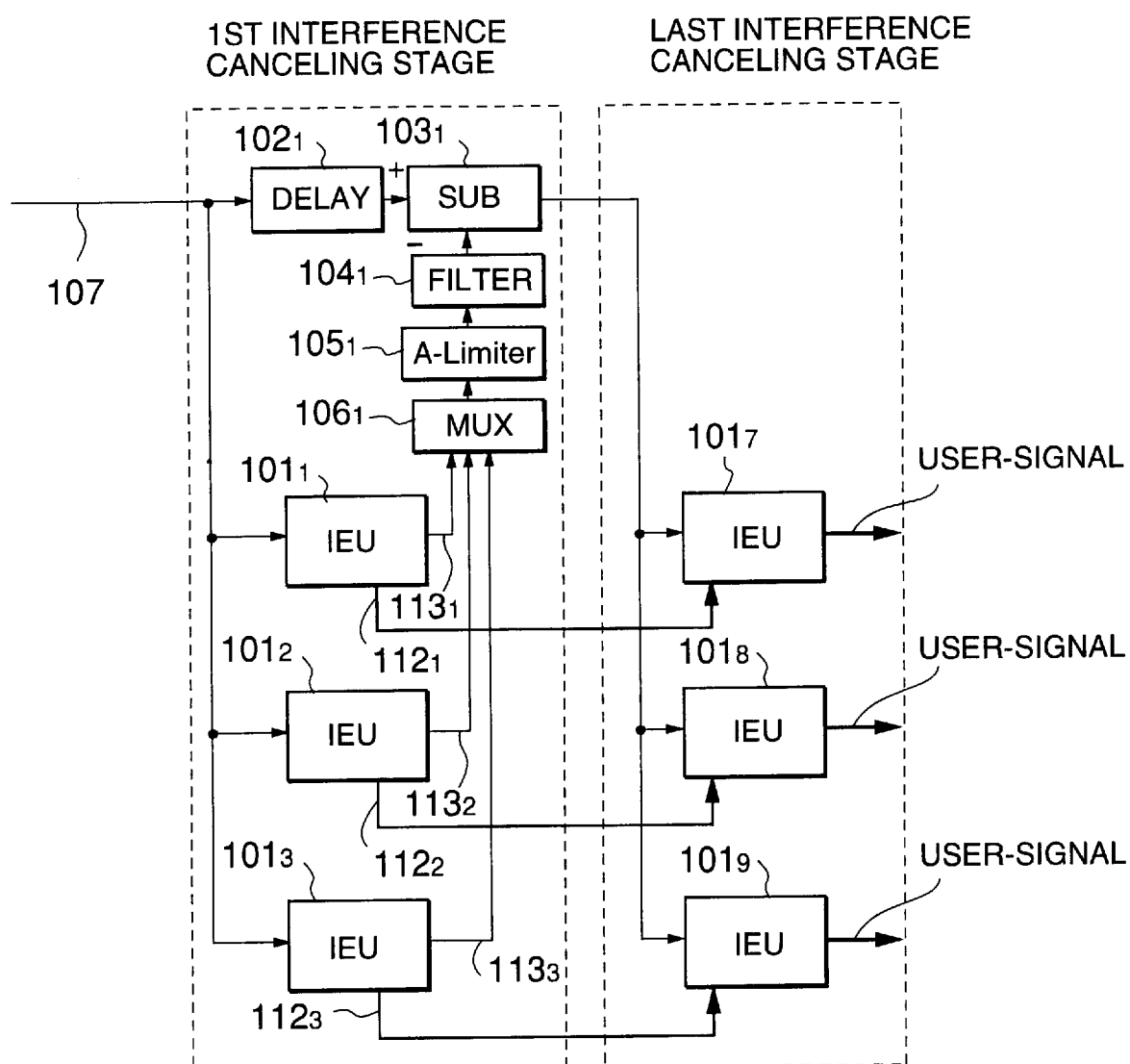
FIG. 9 shows a block diagram of modification of the cancellor shown in FIG. 3, which has no middle stage.

Furthermore, the multi-user interference cancellor may have only two stages, as illustrated in FIG. 9. In this event, the first stage-signal and the first symbol replica signals are directly input into the IEUs of the last interference canceling stage to be processed.

Besides, a selected one of the interference canceling stage may have the multiplexer, the amplitude limiter and the filter, while the remainings may comprise the same structure as the existing interference canceling stages. And also, each of the interference canceling stages may have no amplitude limiter $105_x$. That is, the output of the multiplexer is directly input to the filter. In this event, the level of the multi-user spread-signal must, however, be low, so that the accuracy also decreases.

What is claimed is:

1. A multi-user interference cancellor, operable in response to a multi-user spread signal having a plurality of spread user-signals, to produce user-signals in correspondence with the spread user-signals, said cancellor comprising a plurality of interference canceling stages each of which is adapted to reproduce symbol replica signals corresponding to the user-signals in response to an input signal of each of the interference canceling stages and which is adapted to produce a remnant component of the multi-user spread signal as an output signal of each interference canceling stage, wherein:

each of the interference canceling stages except for the last one comprises:
  a plurality of interference estimation units (IEUs) which are equal in number to processable user-signals, to produce the symbol replica signals corresponding to the user-signals assigned to the IEUs and, wherein said IEUs also produce local spread signals having result information from processing in only said IEUs respectively;
  a processor adapted to process the local spread signals, to calculate, from them, a single vector signal which is obtained by a combination of the local signals; and
  a subtracter adapted to subtract the single vector signal from the input signal, and thereby, to produce the output signal representative of the remnant component; and
wherein the last interference canceling stage produces the user-signals from the symbol replica signals and the output signal, all produced by a preceding one of the interference canceling stages.

2. A multi-user interference cancellor as claimed in claim 1, wherein the processor comprises:
  a multiplexer adapted to multiplex the local spread signals at every IEUs, and thereby, to produce a multiplexed signal; and
  a filter adapted to filter the multiplexed signal into a filtered signal as the single vector signal.

3. A multi-user interference cancellor as claimed in claim 1, wherein the processor comprises:
  a multiplexer adapted to multiplex the local spread signals at every IEUs, and thereby, to produce a multiplexed signal;
  an amplitude limiter adapted to limit an amplitude of the multiplexed signal to a processable range of the cancellor, in question, and thereby, to produce an amplitude limited signal; and
  a filter adapted to filter the amplitude limited signal into a filtered signal as the single vector signal.

4. A multi-user interference cancellor as claimed in claim 1, wherein each of the interference canceling stages except for the last one further comprises a delay unit, operable in response to the input signal, to delay the input signal, and then, to output the delayed input signal to the subtracter.

5. A multi-user interference cancellor as claimed in claim 1, wherein the interference canceling stages are formed by first, middle, and last interference canceling stages which are successively coupled in order.

6. A multi-user interference cancellor as claimed in claim 5, wherein each of the IEUs of the first interference canceling stage reproduces, from the multi-user spread-signal, a first symbol replica signal as the symbol replica signal of the IEU, in question, and also produces, as the local spread signal of the IEU, a first spread signal obtained by despreading the multi-user spread-signal with codes corresponding to the user-signal assigned to the IEU.

7. A multi-user interference cancellor as claimed in claim 6, wherein each of the IEUs of the middle interference canceling stage reproduces, from the output of the first interference canceling stage and the first symbol replica signal responding to the IEU, in question, a middle symbol replica signal as the symbol replica signal of the IEU, and also produces, as the local spread signal of the IEU, a middle spread signal obtained by despreading a subtracted signal which has information of difference between the first and the middle symbol replica signals.

8. A multi-user interference cancellor as claimed in claim 3, said multiplexed signal of the multiplexer being a complex signal, wherein the amplitude limiter comprises:
  a first multiplier adapted to multiply a real component of the multiplexed signal by itself, and thereby, to calculate square of the real component of the multiplexed signal;
  a second multiplier adapted to multiply an imaginary component of the multiplexed signal by itself, and thereby, to calculate square of the imaginary component of the multiplexed signal;
  an adder adapted to add the square of the real component to the square of the imaginary component, and thereby, to produce the power information of the multiplexed signal;
  an amplitude determining section adapted to produce square of a predetermined amplitude level which is previously given to the section, in question, and which corresponds to the processable range of the multi-user interference cancellor;
  a divider adapted to divide the square of the predetermined amplitude level by the power information to produce power suppression rate;
  a square root calculator adapted to calculate square root of the power suppression rate;
  a third multiplier adapted to multiply the square root by the real component of the multiplexed signal, and thereby, to produce a restricted real component;
  a fourth multiplier adapted to multiply the square root by the imaginary component of the multiplexed signal, and thereby, to produce a restricted imaginary component;
  a first selector which selects the restricted real component if the square root of the power suppression rate is smaller than "1" and, on the other hand, selects the real component of the multiplexed signal if the square root of the power suppression rate is not smaller than "1", as real component of the amplitude limited signal; and a second selector which selects the restricted imaginary component if the square root of the power suppression rate is smaller than "1" and, on the other hand, selects the imaginary component of the multiplexed signal if the square root of the power suppression rate is not smaller than "1", as imaginary component of the amplitude limited signal.

9. A multi-user interference cancellor as claimed in claim 3, said multiplexed signal of the multiplexer being a complex signal having a real and an imaginary component each of which has n bits data including one sign bit in quantizing expression, n being integer larger than 2, said local spread signal also being a complex signal having a real and an imaginary component each of which has n--1 bits data including one sign bit in quantizing expression, wherein said amplitude limiter comprises a real and an imaginary parts each of which comprises:

an overflow-detector adapted to detect whether an overflow of multiplexed signal by executing exclusive-OR operation of the sign bit and the most significant bit of the real component of the multiplexed signal, and thereby, to produce an overflow-flag which indicates "1" if the overflow occurs, while indicates "0" if the overflow does not; and a bit-converter, operable in response to the overflow-flag, to produce, as the respective component of the amplitude limited signal, n–1 bits data consisting of the sign bit and n–2 bits obtained by removing the most significant bit from the n–1 bit of the respective component if the overflow flag indicates "0" and, on the other hand, to produce, as the respective component of the amplitude limited signal, n–1 bits data consisting of the sign bit and n–2 bits which all have the same value as the most significant bit if the overflow flag indicates "1."

10. A multi-user interference cancellor as claimed in claim 1, wherein the interference canceling stages are first and last interference canceling stages which are coupled to each other in this order.

11. A multi-user interference cancellor as claimed in claim 1, wherein the interference canceling stages comprise first interference canceling stage, a plurality of middle interference canceling stages, and last interference canceling stage which are successively coupled in order.

12. A multi-user interference cancellor, operable in response to a multi-user spread signal having a plurality of spread user-signals, to produce user-signals in correspondence with the spread user-signals, said cancellor comprising a plurality of interference canceling stages each of which is adapted to reproduce symbol replica signals corresponding to the user-signals in response to an input signal of each of the interference canceling stages and which is adapted to produce a remnant component of the multi-user spread signal as an output signal of the each interference canceling stage, wherein:

a selected one of the interference canceling stages except for the last one comprises:

a plurality of interference estimation units IEUs) which are equal in number to processable user-signals, to produce the symbol replica signals corresponding to the user-signals assigned to the IEUs and to also produce local spread signals having result information of processing in only the IEUs, in question, respectively;

a processor adapted to process the local spread signals, to calculate, from them, a single vector signal which is obtained by a combination of the local signals; and a subtracter adapted to subtract the single vector signal from the input signal, and thereby, to produce the output signal representative of the remnant component; and the last interference canceling stage produces the user-signals from the symbol replica signals and the output signal all produced by a preceding one of the interference canceling stages.

* * * * *